United States Patent [19]
Nesting

[11] Patent Number: 5,711,540
[45] Date of Patent: Jan. 27, 1998

[54] ROLLER CARRIAGE HAVING SWINGABLE WHEELS

[75] Inventor: Erik Markvard Grubbe Nesting, Middelfart, Denmark

[73] Assignee: R. D. Impex ApS, Middelfart, Denmark

[21] Appl. No.: 464,786

[22] PCT Filed: Dec. 21, 1993

[86] PCT No.: PCT/DK93/00432

§ 371 Date: Jul. 31, 1995

§ 102(e) Date: Jul. 31, 1995

[87] PCT Pub. No.: WO94/14668

PCT Pub. Date: Jul. 7, 1994

[30] Foreign Application Priority Data

Dec. 22, 1992 [DK] Denmark .................. 1537/92

[51] Int. Cl.⁶ .................................................. B62B 3/16
[52] U.S. Cl. ........................... 280/33.998; 280/79.11
[58] Field of Search ................... 280/33.991, 33.998, 280/79.11, 35; 206/503, 509

[56] References Cited

U.S. PATENT DOCUMENTS 2,610,750  9/1952  Hulbert .
2,774,503  12/1956  Moore .
3,522,954  8/1970  Locke .................... 280/33.998

FOREIGN PATENT DOCUMENTS

| 168565 B1 | 4/1994 | Denmark . |
| 2126521 | 10/1972 | France . |
| 1556312 | 1/1970 | Germany . |
| 266770 | 11/1991 | Japan .................... 280/33.998 |
| 904198 | 8/1962 | United Kingdom . |
| 2265603 | 10/1993 | United Kingdom .................... 280/33.998 |

*Primary Examiner*—Brian L. Johnson
*Assistant Examiner*—Michael Mar
*Attorney, Agent, or Firm*—Merchant, Gould, Smith, Edell, Welter & Schmidt, P.A.

[57] ABSTRACT

A roller carriage has a carriage bottom below which a plurality of wheels is mounted, at least one of the wheels being mounted swingably about a substantially vertical axis of swing. The roller carriage moreover has retention device to retain the swingable wheel or wheels on an overlying roller carriage, the wheel retention device being constructed as a substantially horizontal guide track which extends along at least part of a circle. The guide track forms two engagement areas which restrict the movement of the swingable wheel or wheels of an overlying roller carriage.

6 Claims, 3 Drawing Sheets

ROLLER CARRIAGE HAVING SWINGABLE WHEELS

FIELD OF THE INVENTION

The invention concerns a roller carriage having a carriage bottom with wheels, a plurality of which is swingably mounted, so called swivel castor wheels, and of the type stated.

BACKGROUND OF THE INVENTION

Roller carriages of this type (see for example U.S. Pat. No. 2,610,750) are usually used for the transport of goods in the distribution network from a wholesaler to retailers. The roller carriages are then transported back to the wholesaler in the empty state, it being a widespread wish that the roller carriages can be compacted so that the return transport can take place smoothly, without the empty roller carriages taking up unduly much space. The roller carriages are therefore stacked on top of each other so as to form a high column of e.g. 20 roller carriages. The problem of roller carriages is that they have swivel castor wheels are difficult to retain in a proper manner during the return transport, and the roller carriages are therefore upwardly provided with retention means which retain the swivel castor wheel on an overlying roller carriage. These retention means retain the wheels in a fixedly orientated direction, so that that when stacking the roller carriages the operator has to ensure that the swivel castor wheels assume the correct orientation.

SUMMARY OF THE INVENTION

The object of the invention is to provide a roller carriage having retention means which enable more flexible stacking.

This object is achieved by a roller carriage on which the retention means are constructed as stated.

This ensures that the swivel castor wheels can be oriented substantially freely when a roller carriage is stacked on top of another roller carriage. The roller carriages will be retained safely, without the operator having to align the wheels with the orientation of the retention means. The engagement areas of the guide tracks ensure that the roller carriage is to be subjected to a considerable force to disengage two roller carriages.

The guide track often extends along a whole circle, since this permits free rotation of the swivel castor wheels. However, owing to considerations of space it may be expedient that the guide track only extends along a segment of a circle, which corresponds to e.g. 90°. Here it may be expedient to provide guide faces at the ends of the guide track to guide the swivel castor wheels into position.

When the guide track only extends along a segment of a circle, it may expediently be provided by punching an arc-shaped recess in the bracket plate for the swivel castor wheels. To increase the size of the engagement area, the side edges of the guide track may be bent obliquely downwards.

In a preferred embodiment of the invention the guide track is provided in that a cone top is formed in a compression moulded metal plate. This cone top is located in extension of the axis of swing the so-called swivel axis, of the swivel castor wheel, and the outer engagement area of the guide track restricting the movement of the wheel is located coaxially with the cone top. This engagement area may be provided in the form of a solid, bent metal wire which may be secured to the metal plate by e.g. welding. Alternatively, both the internal and the external engagement area of the guide track may be provided by compression moulding of the metal plate. When this is the case, the bracket plate or the base plate of the roller carriage will be formed with a rotation-symmetrical cone top about which an annular elevation has been compression moulded. An annular depression serving as a bottom in the guide track is formed between the elevation and the cone top. This depression will thus have a radius of curvature which substantially corresponds to the radius of the swivel castor wheel.

In one embodiment, the guide track has the shape of a ring segment with side edges being provided coaxially with the swivel axis of the swivel castor wheel. The ring segment extends for at least about 1/16 of the circumference of the circle that the swivel castor wheel of an overlaying roller carriage describes during rotation about the swivel axis. In a preferred embodiment, this extension corresponds to the width of the swivel castor wheel.

The invention will be explained more fully below in connection with preferred embodiments and with reference to the drawing, in which.

DETAILED DESCRIPTION OF THE PREFERRED EMBODIMENT

Figure 1:
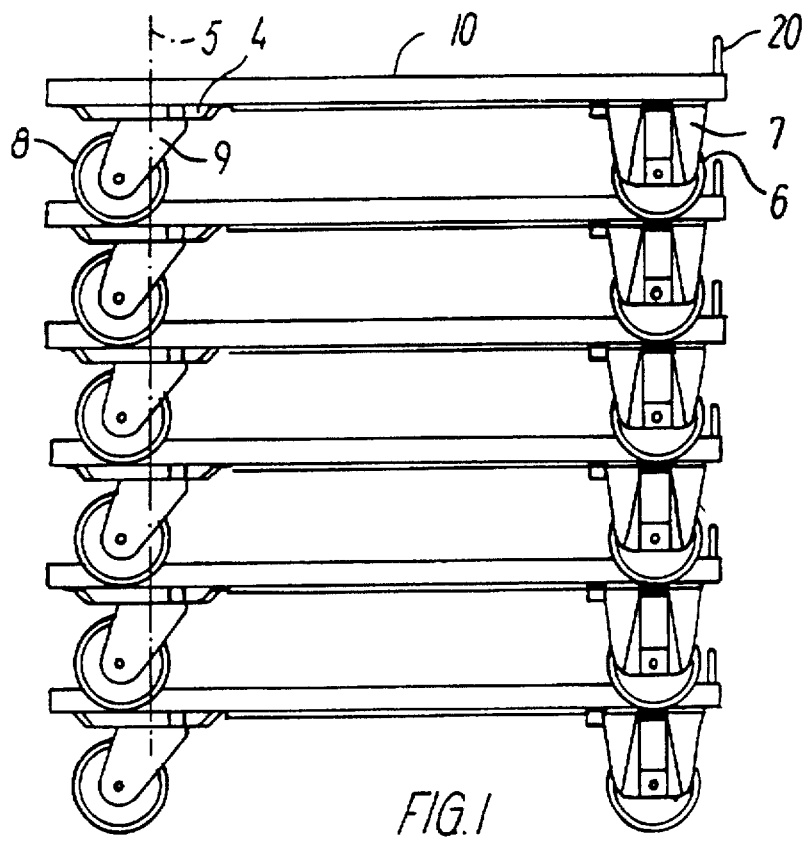
FIG. 1 is a lateral view of a preferred embodiment of a roller carriage stack having retention means according to the invention.

FIG. 1 shows a stack of roller carriages, each of which comprises a carriage bottom below which two fixedly oriented, freely revolving wheels 6 are mounted by means of forks 7 secured to the bottom frame 10 by welding or bolting. In addition, the roller carriage has two swivel castor wheels 8 arranged at the other end of the bottom frame 10, said swivel wheels 8 being secured to respective wheel forks 9 which are swingably secured about a vertical axis 5 so called swivel axis, to a swing wheel bracket 4.

Figure 2:
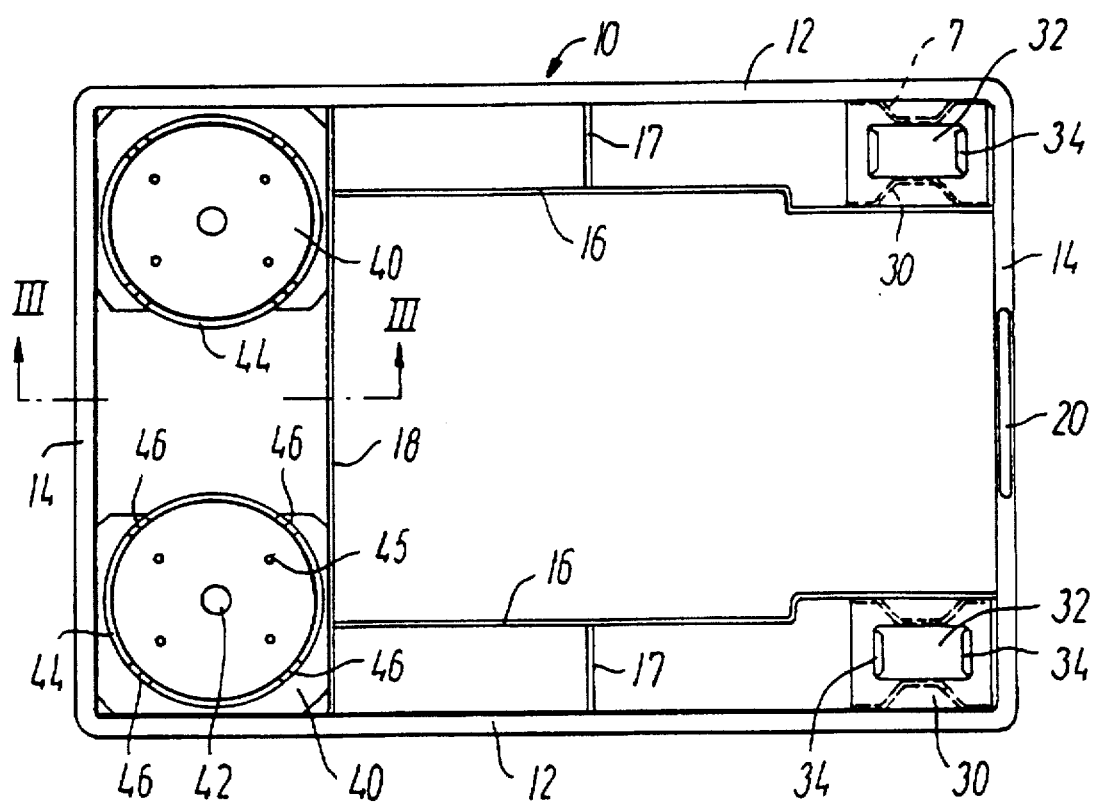
FIG. 2 is a plan view of the carriage bottom on a roller carriage according to the invention.

FIG. 2 is a top view of the bottom frame 10, and it will be seen that the bottom frame 10 comprises a substantially rectangular outer frame consisting of two long sides 12 and two end sides 14. The outer frame is manufactured of a bent profile pipe. A transom 18 is secured between the long sides 12 of the outer frame, and two longitudinal ribs 16 are welded at their one end on the transom and also welded on the end part 14. The longitudinal ribs 16 are connected with the adjoining long sides 12 of the bottom frame through respective stiffening elements 17. Brackets 30, which serve to retain the wheel forks 7, are secured at the corners of one end of the bottom frame between respective ribs 16 and the long side 12 of the bottom frame. The brackets 30 are provided with a recess 32 whose ends are formed with support faces 34 for the wheels 6 of an overlying roller carriage. The oriented wheels 6 are thus retained in a manner known per se by the recesses 32. At the same end of the transverse member 14 the bottom frame is formed with a hoop 20, which partly serves as a stop for goods loaded on the roller carriage, partly serves as a handle for an operator when he stackes the roller carriages. A corresponding hoop may be provided at the other end of the carriage.

However, the brackets 30 may be constructed with the wheel forks 7 as an integral part.

Brackets 40 for each of the swivel castor wheels 8 are provided between the transom 18 and the corners of the bottom frame at the other end of the roller carriage. The brackets 40 are made of a compression moulded metal plate and are formed with a rotation-symmetrical cone top 42, which serves as an interior, restricting engagement face for the wheel 8. In the embodiment shown in FIG. 2 the exterior, restricting engagement face consists of an annular metal wire 44 bent so that the wire 44 engages the bracket plate 40 at four attachment points 46 where the wire is welded to the bracket plate. The wire is raised slightly between the attachment points 46 and is parallel with the bracket plate. In the preferred embodiment the swivel castor wheels of the roller carriage rest on the bracket plate, while the wheels touch both the cone top 42 and the annular wire 44. Thus, irrespective of their orientation the wheels 8 will be retained safely when the roller carriages are stacked on top of each other. Four holes 45 in the bracket plate 40 serve as attachment points for the stationary part of the swingable fork 9.

The hoop 44 can be replaced by a flat iron ring.

Figure 3:
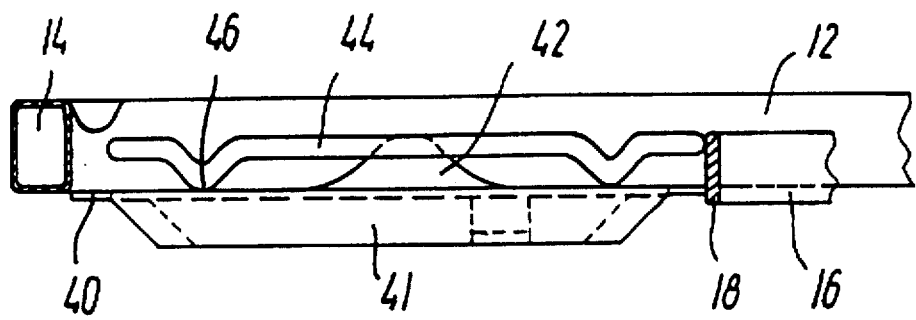
FIG. 3 is a sectional view along the line III—III in FIG. 2.

FIG. 3 shows the bracket 40 on the carriage bottom of FIG. 2 along the line III—III. It will be seen here how the bracket 40 is arranged with respect to the bottom frame of the roller carriage, and it will be seen that the bracket 40 is bent toward the central line of the roller carriage, a bending edge 41 serving as a stiffening for the bracket plate between the frame part 14 and the transom 18. It will likewise be seen how the wire 44 rises above the bracket plate 40 between the attachment points 46.

Figure 4:
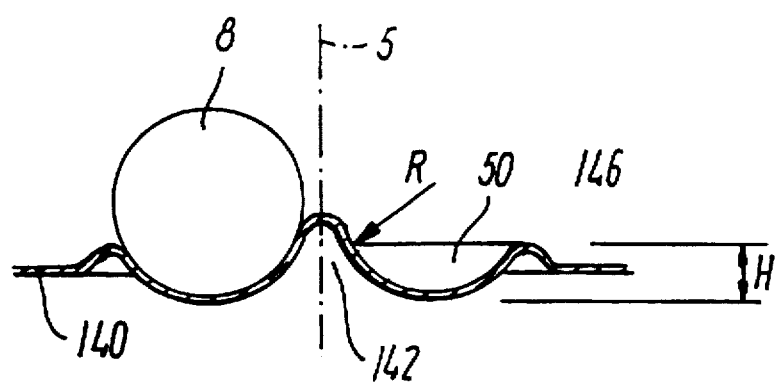
FIG. 4 is a sectional view of an alternative embodiment of the retention means according to the invention.
Figure 5:
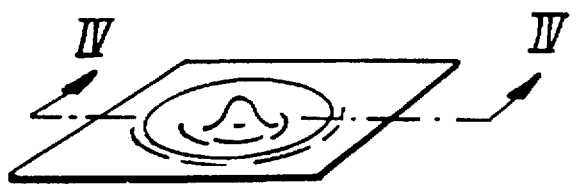
FIG. 5 is a perspective view of the embodiment of FIG. 4 in connection with a bracket plate.

FIGS. 4–5 show an alternative embodiment of a bracket plate 140 for a roller carriage according to the invention. The bracket plate 140 is here compression moulded in the manufacture, so that the interior as well as the exterior engagement face is formed by the bent bracket. An interior cone top 142 and an exterior annular bead 146 form an annular channel 150 which is located coaxially with the vertical swivel axis 5 of a swivel castor wheel. The annular channel 150 has an interior radius of curvature R which is of the same order as the radius of a wheel 8. When the radius R is greater than the radius of the wheel 8, the wheel is permitted to have some movability between the inner and outer engagement faces. If, on the other hand, the radius R is smaller than the radius of the wheel, the wheel 8 does not touch the bottom of the channel 150, but solely engages engagement points in the vicinity of the top of the cone top 142 and the top of the annular elevation 146. If, on the other hand, the radius R corresponds to the radius of the wheel, a roller carriage mounted on top of the roller carriage will have to be raised a height H corresponding to the distance from the bottom of the annular channel 150 to the top of the annular elevation 146 to be disengaged. Although FIGS. 4 and 5 show this embodiment in connection with a bracket plate, nothing prevents the embodiment from being provided in an integral base plate on the roller carriage.

Figure 7:
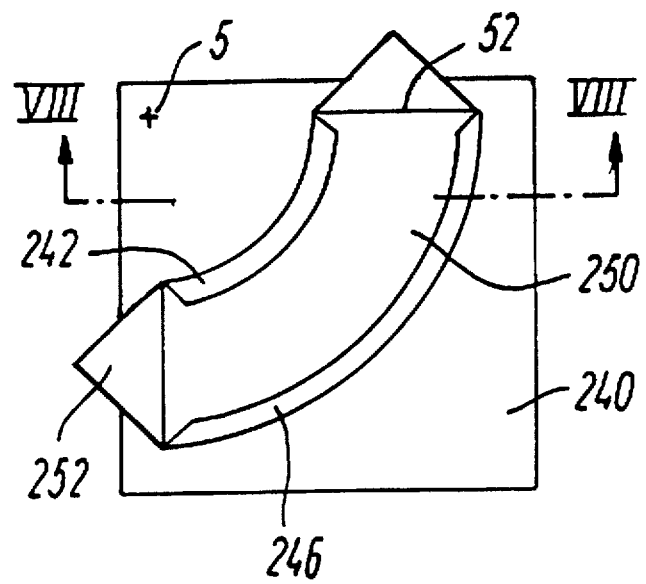
FIG. 7 is a plan view of the bracket plate of FIG. 6 having retention means according to the invention.
Figure 8:
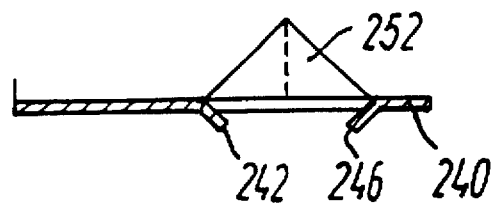
FIG. 8 is a sectional view along the line VIII—VIII in FIG. 7.
Figure 6:
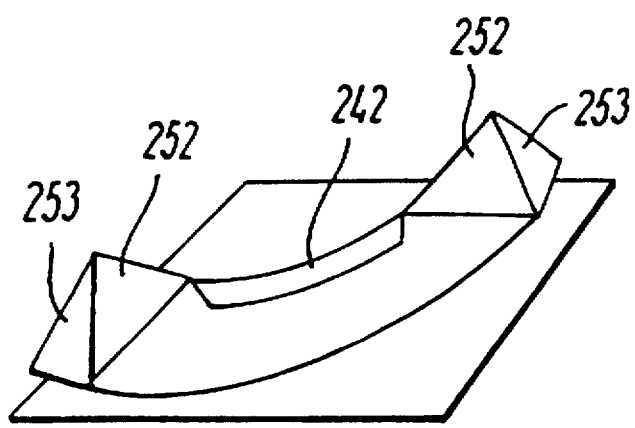
FIG. 6 is a perspective view of an additional alternative embodiment of a bracket plate having retention means according to the invention.

FIGS. 6–8 show an additional alternative embodiment of a bracket plate according to the invention, said embodiment being unique in that the wheel retention means extend only along a segment of a circle. In the shown embodiment the wheel retention means extend 90° about the vertical axis 5 of a swivel castor wheel. The bracket is provided with a recess 250 in the form of a circular segment, and the rim areas 242, 246 of the bracket facing the recess 250 are bent downward to form inclined engagement faces for a swivel castor wheel on an overlying roller carriage. The ends of the recess 250 are formed with inclined guide plates which assist the operator in guiding the swivel castor wheels into position. The guide plates 252 may either be a bent part of the bracket plate 240, since it may be said to be waste material from the recess 250. Alternatively, the guide plates 252 may be mounted separately together with triangular supports 253. Thus, together with two triangular supports 253 the guide plate 252 may form a pyramid having a triangular base area, secured to the bracket plate 240 at the end of the recess 250. In this case too, this embodiment may be used together with a whole base plate secured to the frame of the roller carriage.

The invention has been explained above in connection with stacking where the wheels are arranged directly on top of each other so that the axes of rotation of the swivel castor wheels are flush. However, nothing prevents the invention from being worked also in connection with so-called compact stacking where the roller carriages are stacked offset. This means that a roller carriage is arranged on top of another in a manner such that the swivel castor wheels protrude in front of the frame part 14, while the fixedly oriented wheels are received between the bracket 30 and the cross member 17. Roller carriage No. 3 is then arranged on top of the first roller carriage with its fixedly oriented wheels arranged on the wheel retention means of the bracket, while the swivel castor mounted wheels are arranged in the circular retention means 42, 44. It should be noted here that it is of course necessary for the longitudinal rib 16 to be moulded in such a manner that it does not prevent the offset stacking. Offset stacking is described in detail in the Danish patent 168565.

The invention has been explained above with reference to a bottom frame composed of metal pipes, but nothing prevents the invention from being worked in connection with a carriage bottom made of moulded plastics.

What is claimed is:

1. A roller carriage comprising:
    a carriage bottom below which a plurality of wheels are mounted, at least one of said wheels being a swivel castor wheel rotatable about a substantially vertical swivel axis;
    retention means positioned above said swivel caster wheel for retaining an overlaying swivel castor wheel of a similar overlaying roller carriage with the swivel axes being vertically aligned, said retention means being constructed as a substantially horizontal, circular guide track upon which the overlaying swivel caster wheel is supported, the retention means including:
        an outer engagement member arranged at least partly around an outer edge of the guide track;
        a central inner engagement member, a rolling movement of said overlaying swivel castor wheel being restricted by said outer and inner engagement members when said caster wheel rests upon said guide track;
        wherein said outer and inner engagement members each have an engagement surface for restricting the rolling movement of the overlaying swivel castor wheel to the guide track, each of said engagement surfaces having a curvature with an axis of rotation coaxial with said vertical swivel axis and are located at a higher level than a lowest point of said overlaying swivel castor wheel when the overlaying swivel castor wheel rests upon said guide track.

2. A roller carriage according to claim 1, wherein said inner engagement member is formed by a rotation-symmetrical cone top which is provided in a compression moulded metal plate.

3. A roller carriage according to claim 2, wherein said outer engagement member is formed by a hoop in a form of a bent metal wire of flat iron which extends exteriorly about the rotation-symmetrical cone top and is secured to the metal plate.

4. A roller carriage according to claim 1, wherein the guide track is provided in a wheel bracket plate for the swivel castor wheel, the guide track has a shape of a ring segment with side edges, each side edge having a curvature with an axis of rotation coaxial with the swivel axis of the swivel castor wheel, and the ring segment extends for at least about 1/16 of the circumference of a circle that said swivel castor wheel of the overlaying roller carriage describes during rotation about said swivel axis.

5. A roller carriage comprising:

a carriage bottom below which a plurality of wheels are mounted, at least one of said wheels being a swivel castor wheel rotatable about a substantially vertical swivel axis;

retention means positioned above said swivel caster wheel for retaining an overlaying swivel castor wheel of a similar overlaying roller carriage with the swivel axes being vertically aligned, said retention means being constructed as a substantially horizontal, circular guide track upon which the overlaying swivel caster wheel is supported, the retention means including:

an outer engagement member arranged at least partly around an outer edge of the guide track;

a central inner engagement member, a rolling movement of said overlaying swivel castor wheel being restricted by said outer and inner engagement members;

wherein said outer and inner engagement members each have an engagement surface for restricting the rolling movement of the overlaying swivel castor wheel to the guide track, each of said engagement surfaces having a curvature with an axis of rotation coaxial with said vertical swivel axis and are located at a higher level than a lowest point of said overlaying swivel castor wheel when the overlaying swivel castor wheel rests upon said guide track, and said inner engagement member being formed by a rotation-symmetrical cone top which is provided in a compression moulded metal plate.

6. A roller carriage according to claim 5, wherein said outer engagement member is formed by a hoop in a form of a bent metal wire of flat iron which extends exteriorly about the rotation-symmetrical cone top and is secured to the metal plate.

\* \* \* \* \*